United States Patent
Xu et al.

(10) Patent No.: US 12,439,388 B2
(45) Date of Patent: Oct. 7, 2025

(54) CONTROL INFORMATION TRANSMISSION METHOD AND APPARATUS, AND TERMINAL DEVICE

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN); Bin Liang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 406 days.

(21) Appl. No.: 18/147,571

(22) Filed: Dec. 28, 2022

(65) Prior Publication Data

US 2023/0134784 A1    May 4, 2023

Related U.S. Application Data

(63) Continuation of application No. PCT/CN2020/105919, filed on Jul. 30, 2020.

(51) Int. Cl.
*H04W 72/0446* (2023.01)
*H04L 1/1829* (2023.01)
(Continued)

(52) U.S. Cl.
CPC ....... *H04W 72/0446* (2013.01); *H04L 1/1861* (2013.01); *H04L 1/1893* (2013.01); *H04W 72/21* (2023.01)

(58) Field of Classification Search
CPC .............. H04W 72/21; H04W 72/0446; H04L 1/1861; H04L 1/1893
See application file for complete search history.

(56) References Cited

U.S. PATENT DOCUMENTS 10,548,096 B2    1/2020  Papasakellariou
2014/0269454 A1  9/2014  Papasakellariou
(Continued)

FOREIGN PATENT DOCUMENTS

CN    110166214 A    8/2019
EP    3664338 A1     6/2020

OTHER PUBLICATIONS

First Office Action of the European application No. 20947543.3, issued on Nov. 19, 2024, 5 pages.
(Continued)

*Primary Examiner* — Brian P Cox
(74) *Attorney, Agent, or Firm* — PERKINS COIE LLP

(57) ABSTRACT

A control information transmission method and apparatus, and a terminal device. A terminal device receives a first downlink signal, hybrid automatic repeat request-acknowledgement (HARQ-ACK) information corresponding to the first downlink signal being transmitted by means of a first physical uplink control channel (PUCCH); the terminal device receives a second downlink signal, HARQ-ACK information corresponding to the second downlink signal being transmitted by means of a second PUCCH. The second PUCCH and the first PUCCH correspond to a same HARQ-ACK codebook; and the terminal device cancels the transmission of the first PUCCH and transmits the second PUCCH, the second PUCCH carrying a first HARQ-ACK codebook, and the first HARQ-ACK codebook at least comprising the HARQ-ACK information corresponding to the second downlink signal.

14 Claims, 5 Drawing Sheets

(51) Int. Cl.
  *H04L 1/1867* (2023.01)
  *H04W 72/21* (2023.01)

(56) References Cited

U.S. PATENT DOCUMENTS

| | | | |
|---|---|---|---|
| 2017/0331596 A1 | 11/2017 | Guan et al. | |
| 2018/0310257 A1 | 10/2018 | Papasakellariou | |
| 2020/0137695 A1 | 4/2020 | Papasakellariou | |
| 2020/0145144 A1 | 5/2020 | Hosseini et al. | |
| 2020/0295878 A1 | 9/2020 | Choi | |
| 2022/0158769 A1* | 5/2022 | Gou | H04W 72/23 |
| 2022/0368462 A1 | 11/2022 | Choi | |
| 2022/0376832 A1 | 11/2022 | Choi | |
| 2023/0216614 A1* | 7/2023 | Wang | H04L 1/189 |
| | | | 370/329 |

OTHER PUBLICATIONS

Second Office Action of the Chinese application No. 202310385321.7, issued on Dec. 3, 2024, 12 pages with English translation.
First Office Action of the Chinese application No. 202310385321.7, issued on Sep. 3, 2024. 13 pages with English translation.
Qualcomm: "Summary of the Remaining Issues on HARQ and Scheduling Enhancements for URLLC", 3GPP Draft; R1-2002720, 3rd Generation Partnership Project (3GPP), Mobile Competence Centre; 650, Route Des Lucioles; F-06921 Sophia-Antipolis Cedex; France vol. RAN WG1, No. eMeeting; Apr. 20-Apr. 30, 2020, Apr. 18, 2020 (Apr. 18, 2020), XP052342790, pp. 7, 6, 2. 7 pages.
Ericsson: "Remaining Issue of Scheduling/HARQ for NR URLLC", 3GPP Draft; R1-2001787, 3rd Generation Partnership Project (3GPP), Mobile Competence Centre; 650, Route Des Lucioles; F-06921 Sophia-Antipolis Cedex; France vol. RAN WG1, No. e-Meeting; Apr. 20-Apr. 30, 2020, Apr. 11, 2020 (Apr. 11, 2020), XP052341870, pp. 2, 3. 4 pages.

Panasonic: "Discussion on UCI and PUCCH enhancement for URLLC", 3GPP Draft; R1-1812796, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12-Nov. 16, 2018, Nov. 11, 2018 (Nov. 11, 2018), XP051554756, pp. 2, 3. 5 pages.
Partial Supplementary European Search Report in the European application No. 20947543.3, mailed on Jul. 4, 2023. 16 pages.
Qualcomm, "Summary for [100b-e-NR-L1enh-URLLC-Scheduling and HARQ-01]", 3GPP TSG RAN WG1 #100b eMeeting R1-2003059, Apr. 20-30, 2020—13 pages.
ZTE, "Remaining issues on UL control enhancements for NR URLLC", 3GPP TSG RAN WG1 #101 e-Meeting R1-2003318, May 25-29, 2020—11 pages.
International Search Report in the international application No. PCT/CN2020/105919, mailed on Apr. 25, 2021—5 pages.
Written Opinion of the International Search Authority in the international application No. PCT/CN2020/105919, mailed on Apr. 25, 2021—8 pages.
3GPP TS 38.213 V16.1.0, "3rd Generation Partnership Project; Technical Specification Group Radio Access Network; NR; Physical layer procedures for control (Release 16)", Technical Specification (Mar. 2020)—156 pages.
Wilus Inc: "Remaining issues on UCI enhancement for NR URLLC", 3GPP Draft; R1-2004523, 3rd Generation Partnership Project (3GPP), Mobile Competence Centre ;650, Route Des Lucioles ; F-06921 Sophia-Antipolis Cedex ; France vol. RAN WG1, No. e-Meeting; May 25-Jun. 5, 2020 May 16, 2020(May 16, 2020), XP052345896, p. 1, paragraph 2, 6 pages.
Supplementary European Search Report in the European application No. 20947543.3, mailed on Nov. 15, 2023, 17 pages.
Third Office Action of the Chinese application No. 202310385321.7, issued on Mar. 5, 2025, 12 pages with English translation.

* cited by examiner

| occupation information for PDSCH 0 DAI=0 | occupation information for PDSCH 1 DAI=1 | HARQ-ACK information for PDSCH 2 DAI=2 |

| HARQ-ACK information for PDSCH 0 DAI=0 | occupation information for PDSCH 1 DAI=1 | HARQ-ACK information for PDSCH 2 DAI=2 |

| HARQ-ACK information or occupation information for PDSCH 0 DAI=0 | HARQ-ACK information for PDSCH 2 DAI=2 |

CONTROL INFORMATION TRANSMISSION METHOD AND APPARATUS, AND TERMINAL DEVICE

CROSS REFERENCE TO RELATED APPLICATIONS

This a continuation of International Application No. PCT/CN2020/105919, filed on Jul. 30, 2020, and entitled "CONTROL INFORMATION TRANSMISSION METHOD AND APPARATUS, AND TERMINAL DEVICE", the disclosure of which is incorporated herein by reference in its entirety.

TECHNICAL FIELD

Embodiments of the present disclosure relate to the technical field of mobile communication, and in particular, to a method and apparatus for transmitting control information, and a terminal device.

BACKGROUND

When time domain resources of uplink channels with different priorities overlap, the transmission of a low-priority uplink channel is canceled, and only a high-priority uplink channel is transmitted. In one aspect, in some scenarios, the content in the canceled low-priority uplink channel has the opportunity to be transmitted on non-conflicting resources. In the other aspect, it is proposed in the 3rd Generation Partnership Project (3GPP) meeting that the content in the canceled low-priority uplink channel will not be transmitted any longer. A scheme is needed to specify how to transmit the content in the uplink channel.

SUMMARY

The embodiments of the present disclosure provide a method and apparatus for transmitting control information, and a terminal device.

The method for transmitting control information according to an embodiment of the present disclosure may include the following operations.

A terminal device receives a first downlink signal. Hybrid Automatic Repeat Request-Acknowledgement (HARQ-ACK) information corresponding to the first downlink signal is transmitted through a first Physical Uplink Control Channel (PUCCH).

The terminal device receives a second downlink signal. The HARQ-ACK information corresponding to the second downlink signal is transmitted through a second PUCCH. The second PUCCH and the first PUCCH correspond to the same HARQ-ACK codebook.

The terminal device cancels the transmission of the first PUCCH and transmits the second PUCCH. The second PUCCH carries a first HARQ-ACK codebook, and the first HARQ-ACK codebook at least comprises the HARQ-ACK information corresponding to the second downlink signal.

The method for transmitting control information according to an embodiment of the present disclosure may include the following operations.

The terminal device receives a first downlink signal. HARQ-ACK information corresponding to the first downlink signal is transmitted through a first PUCCH.

The terminal device cancels the transmission of the first PUCCH, and does not expect to receive a second downlink signal. The HARQ-ACK information corresponding to the second downlink signal is transmitted through a second PUCCH. The second PUCCH and the first PUCCH correspond to the same HARQ-ACK codebook.

An apparatus for transmitting control information according to an embodiment of the present disclosure may be applied to a terminal device and may include a receiving unit and a transmission unit.

The receiving unit is configured to: receive a first downlink signal, the HARQ-ACK information corresponding to the first downlink signal being transmitted through a first PUCCH; and receive a second downlink signal, the HARQ-ACK information corresponding to the second downlink signal being transmitted through a second PUCCH. The second PUCCH and the first PUCCH correspond to the same HARQ-ACK codebook.

The transmission unit is configured to cancel the transmission of the first PUCCH and transmit the second PUCCH. The second PUCCH carries a first HARQ-ACK codebook, and the first HARQ-ACK codebook at least includes the HARQ-ACK information corresponding to the second downlink signal.

An apparatus for transmitting control information according to an embodiment of the present disclosure may be applied to a terminal device and may include a receiving unit and a transmission unit.

The receiving unit is configured to receive a first downlink signal. The HARQ-ACK information corresponding to the first downlink signal is transmitted through a first PUCCH.

The transmission unit is configured to cancel the transmission of the first PUCCH and does not expect to receive a second downlink signal. The HARQ-ACK information corresponding to the second downlink signal is transmitted through a second PUCCH. The second PUCCH and the first PUCCH correspond to the same HARQ-ACK codebook.

A terminal device according to the embodiment of the present disclosure may include a processor and a memory. The memory is configured to store a computer program, and the processor is configured to call and run the computer program stored in the memory to execute the abovementioned method for transmitting control information.

A chip according to an embodiment of the present disclosure is configured to implement the abovementioned method for transmitting control information.

Specifically, the chip may include: a processor, configured to call and run a computer program from a memory to enable a device installed with the chip to execute the abovementioned method for transmitting control information.

A computer readable storage medium according to an embodiment of the present disclosure is configured to store a computer program. The computer program enables a computer to execute the abovementioned method for transmitting control information.

A computer program product according to an embodiment of the present disclosure may include computer program instructions. The computer program instructions enable the computer to execute the abovementioned method for transmitting control information.

A computer program according to an embodiment of the present disclosure enables a computer to execute the abovementioned method for transmitting control information when running on the computer.

By the abovementioned technical solution, the first HARQ-ACK codebook is transmitted through the second PUCCH in a case that the terminal device cancels transmission of the first PUCCH, which specifies the content in the first HARQ-ACK codebook, that is, the first HARQ-ACK codebook at least includes the HARQ-ACK information corresponding to the second downlink signal, that is, a construction mode of the first HARQ-ACK codebook is specified.

BRIEF DESCRIPTION OF THE DRAWINGS

The accompanying drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure. In the accompanying drawings.

DETAILED DESCRIPTION

The technical solutions in the embodiments of the present disclosure will be described below with reference to the accompanying drawings in the embodiments of the present disclosure. It is apparent that the described embodiments are part rather than all embodiments of the present disclosure. All other embodiments obtained by those of ordinary skill in the art based on the embodiments of the present disclosure without creative efforts shall fall within the scope of protection of the present disclosure.

The technical solutions of the embodiments of the present disclosure may be applied to various communication systems, for example, a Long Term Evolution (LTE) system, an LTE Frequency Division Duplex (FDD) system, an LTE Time Division Duplex (TDD) system, a 5G (5th generation) communication system, a future communication system, etc.

Figure 1:
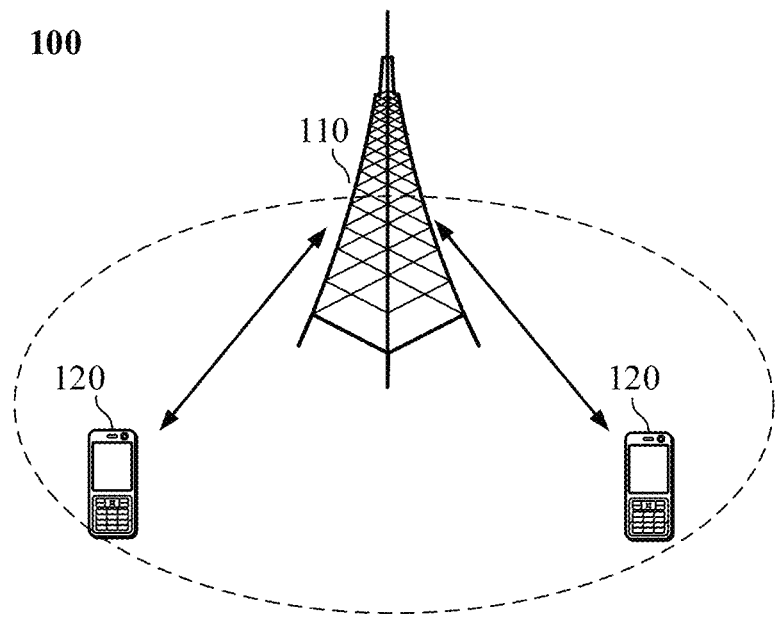
FIG. 1 illustrates a schematic diagram of a communication system architecture according to an embodiment of the present disclosure.

Exemplarily, the communication system 100 applied to the embodiments of the present disclosure is as shown in FIG. 1. The communication system 100 may include a network device 110. The network device 110 may be a device in communication with a terminal device 120. The network device 110 may provide communication coverage for a specific geographical area, and may communicate with a terminal located within a coverage area. Optionally, the network device 110 may be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in the 5G network, or a network device in a future communication system.

The communication system 100 further includes at least one terminal device 120 located within the coverage of the network device 110. The terminal device 120 is connected with the network device 110 through a wired line or a wireless interface. The terminal device 120 connected with the network device 110 through a wireless interface may be called a "wireless communication terminal", a "wireless terminal", or a "mobile terminal". The terminal may refer to an access terminal, a User Equipment (UE), a user unit, a user station, a mobile platform, a mobile station, a remote station, a remote terminal, a mobile device, a user terminal, a terminal, a wireless terminal device, a user agent or a user apparatus, a cellular phone, a cordless phone, a Session Initiation Protocol (SIP) phone, a Wireless Local Loop (WLL) station, a Personal Digital Assistant (PDA), a handheld device having a wireless communication function, a computing device or another processing devices connected to a wireless modem, an on-board device, a wearable device, a terminal device in a 5G network, a terminal device in a Public Land Mobile Network (PLMN) in future evolution, etc.

Optionally, Device to Device (D2D) communication may be performed between the terminal devices 120.

Optionally, a 5G communication system or a 5G network may also be called a New Ratio (NR) system or an NR network.

FIG. 1 exemplarily illustrates one network device and two terminal devices. Optionally, the communication system 100 may include a plurality of network devices and the coverage of each network device may include other number of terminal devices. No limits are made thereto in the embodiments of the present disclosure.

Optionally, the communication system 100 may further include other network entities, such as a network controller and a mobile management entity. No limits are made thereto in the embodiments of the present disclosure.

It is to be understood that a device with a communications function in a network/a system in the embodiments of the present disclosure may be called a communication device. Taking a communication system 100 as shown in FIG. 1 as an example, the communication system 100 may include a network device 110 and a terminal device 120 with a communication function. The network device 110 and the terminal device 120 may be specific devices as described above, which will not be elaborated herein. The communication system 100 may also include other devices, for example, other network entities, such as a network controller and a mobile management entity. No limits are made thereto in the embodiments of the present disclosure.

It should be understood that the terms "system" and "network" are often used interchangeably herein. The term "and/or" herein is only an association relationship for describing associated objects and indicates that three relationships may exist. For example, A and/or B may indicate the following three cases: only A exists, both A and B exist, and only B exists. In addition, the character "/" herein generally indicates that the contextual objects are in an "or" relationship.

In order to facilitate the understanding of the technical solutions of the embodiments of the present disclosure, the technical solutions related to the embodiments of the present disclosure are described below.

When time domain resource overlapping of uplink channels with different priorities is introduced in an Ultra-Reliable Low-Latency Communications (URLLC) project, the transmission of a low-priority uplink channel is canceled, and only a high-priority uplink channel is transmitted, so as to ensure the low delay and high reliability of an URLLC service. However, in some scenarios, the content in the canceled low-priority uplink channel also has the opportunity to be transmitted on non-conflicting resources. In a 3GPP meeting, it is proposed that the content in the canceled low-priority uplink channel will not be transmitted any longer for the abovementioned scenarios.

Figure 2:
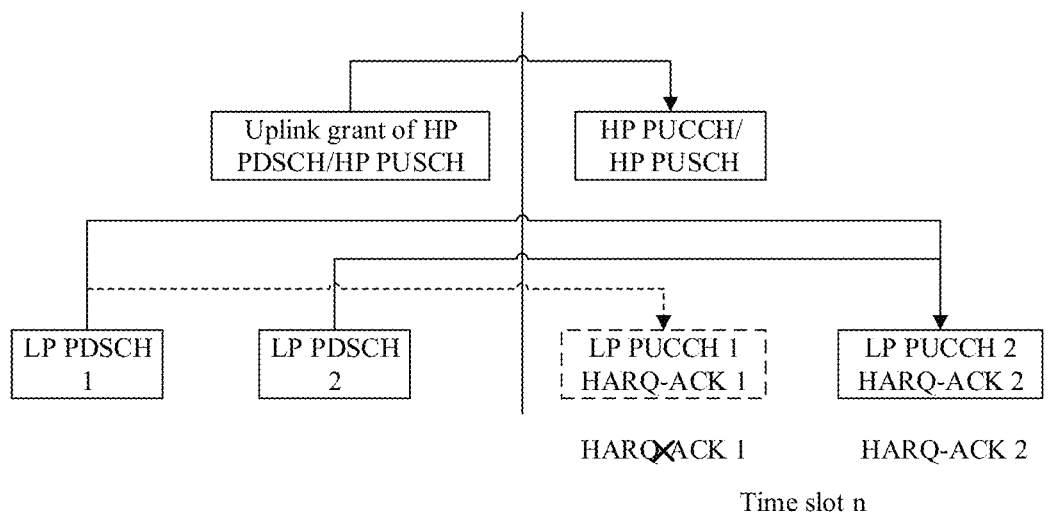
FIG. 2 illustrates a schematic diagram of a time domain resource overlapping according to an embodiment of the present disclosure.

The related art indicates that the HARQ-ACK information pointing to the same slot or sub-slot and corresponding to the same priority constitutes an HARQ-ACK codebook. The terminal device transmits the HARQ-ACK codebook by using the PUCCH indicated by the Downlink Control Information (DCI) received last time. As shown in FIG. 2, LP indicates Low Priority and HP indicates High Priority. The HARQ-ACK 1 information corresponding to LP PDSCH 1 is transmitted through the LP PUCCH 1. The HARQ-ACK 2 information corresponding to LP PDSCH 2 is transmitted through the LP PUCCH 2. The HARQ-ACK 1 information and the HARQ-ACK 2 information point to the same slot (that is, slot n) and correspond to the same physical priority (that is, LP). Therefore, the HARQ-ACK 1 information and the HARQ-ACK 2 information will constitute an HARQ-ACK codebook. The HARQ-ACK codebook is transmitted through the LP PUCCH 2. However, according to the conclusions of the abovementioned meeting, when the time domain resource for an LP PUCCH 1 and the time domain resource for an HP PUCCH or an HP Physical Uplink Shared Channel (PUSCH) overlap, the transmission of the LP PUCCH 1 will be canceled, and the HARQ-ACK 1 information in LP PUCCH 1 will be lost. The HP PUCCH is used to transmit the HARQ-ACK information of HP PDSCH, the HP PUSCH is scheduled based on a UL grant, and the HP PUSCH is used to transmit uplink data. Then, how to construct an HARQ-ACK codebook transmitted in the LP PUCCH 2 needs to be specified. Therefore, the following technical solutions of the embodiments of the present disclosure are proposed.

Figures 3, 4, 5:
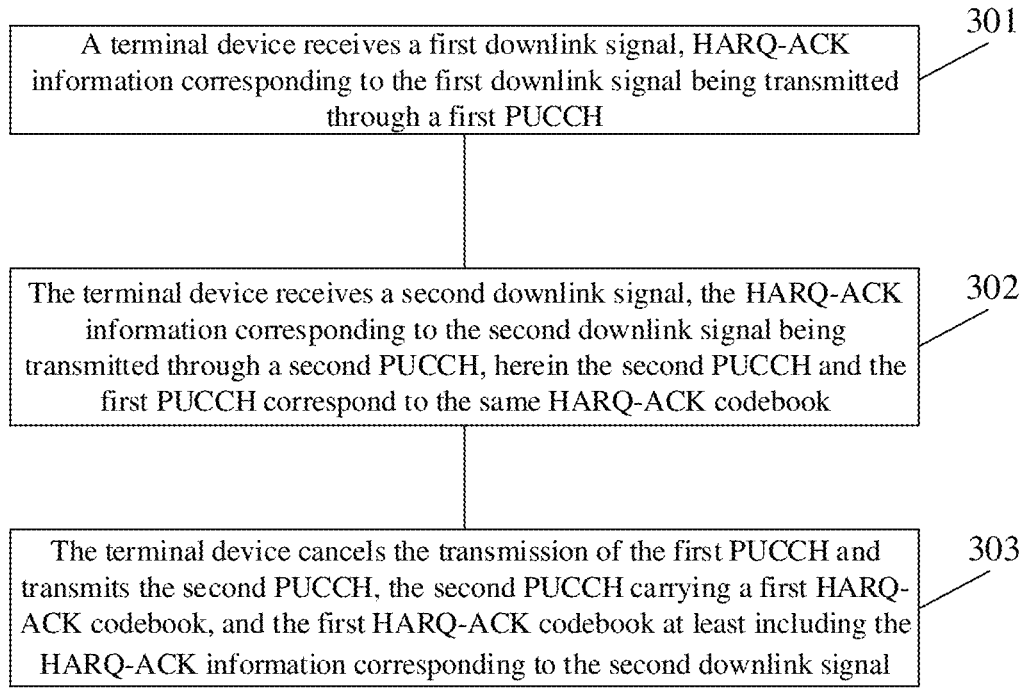
FIG. 3 illustrates a schematic flowchart 1 of a method for transmitting control information according to an embodiment of the present disclosure.
FIG. 4 illustrates a schematic diagram of a first HARQ-ACK codebook of Example 1 according to an embodiment of the present disclosure.
FIG. 5 illustrates a schematic diagram of a first HARQ-ACK codebook of Example 2 according to an embodiment of the present disclosure.

FIG. 3 illustrates a schematic flowchart 1 of a method for transmitting control information according to an embodiment of the present disclosure. As shown in FIG. 3, the method for transmitting control information includes the following steps.

At S301, a terminal device receives a first downlink signal. HARQ-ACK information corresponding to the first downlink signal is transmitted through a first PUCCH.

In the embodiment of the present disclosure, the first downlink signal is transmitted through a first PDSCH. That is to say, the terminal device receives a first PDSCH, and the first PDSCH carries the first downlink signal. The HARQ-ACK information corresponding to the first downlink signal is transmitted through the first PUCCH. Here, optionally, configuration information of the first PUCCH is carried in the DCI for scheduling the first PDSCH.

At S302, the terminal device receives a second downlink signal. The HARQ-ACK information corresponding to the second downlink signal is transmitted through a second PUCCH. The second PUCCH and the first PUCCH correspond to the same HARQ-ACK codebook.

In the embodiment of the present disclosure, the second downlink signal is transmitted through a second PDSCH. That is to say, the terminal device receives the second PDSCH, and the second PDSCH carries the second downlink signal. The HARQ-ACK information corresponding to the second downlink signal is transmitted through the second PUCCH. Here, optionally, configuration information of the second PUCCH is carried in the DCI for scheduling the second PDSCH.

In the embodiment of the present disclosure, the second PUCCH and the first PUCCH correspond to the same HARQ-ACK codebook. That is to say, the HARQ-ACK information corresponding to the first downlink signal and the HARQ-ACK information corresponding to the second downlink signal can constitute an HARQ-ACK codebook. It is to be noted that the condition that the HARQ-ACK information corresponding to the first downlink signal and the HARQ-ACK information corresponding to the second downlink signal can constitute an HARQ-ACK codebook is that: the HARQ-ACK information corresponding to the first downlink signal and the HARQ-ACK information corresponding to the second downlink signal point to the same slot or sub-slot and correspond to the same priority.

It is to be noted that the priority of the HARQ-ACK information is the priority of the PUCCH for transmitting the HARQ-ACK information. It can be seen that the second PUCCH and the first PUCCH have the same priority.

At S303, the terminal device cancels the transmission of the first PUCCH and transmits the second PUCCH. The second PUCCH carries a first HARQ-ACK codebook, and the first HARQ-ACK codebook at least includes the HARQ-ACK information corresponding to the second downlink signal.

In the embodiment of the present disclosure, the terminal device further receives a third downlink signal before receiving the second downlink signal, that is: a time domain resource for the third downlink signal is located before the time domain resource for the second downlink signal. The terminal device determines to cancel the transmission of the first PUCCH in a case that the time domain resource for a first uplink transmission channel corresponding to the third downlink signal overlaps with the time domain resource for the first PUCCH; and the terminal device determines to transmit the second PUCCH in a case that the time domain resource for the first uplink transmission channel corresponding to the third downlink signal does not overlap with the time domain resource for the second PUCCH.

In the embodiment of the present disclosure, the third downlink signal and the first uplink transmission channel corresponding to the third downlink signal may be implemented in the following two modes.

A) In an optional mode of the present disclosure, the third downlink signal is transmitted through a third PDSCH, that is to say, the terminal device receives the third PDSCH, and the third PDSCH carries the third downlink signal. The HARQ-ACK information corresponding to the third downlink signal is transmitted through the third PUCCH (that is, the first uplink transmission channel). Here, optionally, configuration information of the third PUCCH is carried in the DCI for scheduling the third PDSCH.

B) In an optional mode of the present disclosure, the third downlink signal is transmitted through a fourth PDCCH, that is to say, the terminal device receives the fourth PDCCH, and the fourth PDCCH carries the third downlink signal. Here, the DCI in the fourth PDCCH is used for scheduling the PUSCH (that is, the first uplink transmission channel). For example, the third downlink signal carries UL grant information of the PUSCH.

In the embodiment of the present disclosure, the priority of the first uplink transmission channel (such as the third PUCCH or PUSCH) corresponding to the third downlink signal is higher than that of the first PUCCH and the second PUCCH. 1) The terminal device determines to cancel the transmission of the first PUCCH in a case that the time domain resource for the first uplink transmission channel corresponding to the third downlink signal overlaps with the time domain resource for the first PUCCH; and 2) the terminal device determines to transmit the second PUCCH in a case that the time domain resource for the first uplink transmission channel corresponding to the third downlink signal does not overlap with the time domain resource for the second PUCCH.

In the embodiment of the present disclosure, the second PUCCH carries a first HARQ-ACK codebook, and the first HARQ-ACK codebook at least includes the HARQ-ACK information corresponding to the second downlink signal. Specific implementation modes of the first HARQ-ACK codebook are described as follows.

Mode 1

The first HARQ-ACK codebook includes the HARQ-ACK information corresponding to the second downlink signal. The first HARQ-ACK codebook does not include the HARQ-ACK information or occupation information corresponding to the first downlink signal. Further, the first HARQ-ACK codebook does not include the HARQ-ACK information for occupation information corresponding to at least one downlink signal before the first downlink signal. The at least one downlink signal corresponds to the same HARQ-ACK codebook.

In the embodiment of the present disclosure, the first HARQ-ACK codebook PUCCH merely includes the HARQ-ACK information corresponding to the downlink signal after the first downlink signal corresponding to the cancelled PUCCH (that is, the first PUCCH).

It is to be noted that the first HARQ-ACK codebook includes N bits. N is a positive integer. Each of the N bits corresponds to one downlink signal (that is, one PDSCH). The value of the bit is used for indicating the HARQ-ACK information of the downlink signal corresponding to the bit. For example, if the value of the bit is 1, it indicates that the HARQ-ACK information of the downlink signal corresponding to the bit is ACK. If the value of the bit is 0, it indicates that the HARQ-ACK information of the downlink signal corresponding to the bit is NACK.

I) In an optional mode, correspondences between bits in the first HARQ-ACK codebook and the downlink signals are determined based on semi-static configuration information in a case that the first HARQ-ACK codebook is a type-1 HARQ-ACK codebook. Here, the semi-static configuration information is used for determining a feedback timing set, a PDSCH time domain resource indication set, etc.

It is to be noted that the bits included in the first HARQ-ACK codebook correspond to various physical resources for the PDSCHs that can be transmitted in a feedback window configured by the semi-static configuration information, while the number of the actually scheduled PDSCHs is less than or equal to that of the PDSCHs that can be transmitted in the feedback window.

It is to be noted that in the first HARQ-ACK codebook, the HARQ-ACK information corresponding to the downlink signal after the first downlink signal corresponding to the first PUCCH is valid.

II) In an optional mode, a correspondence between a bit in the first HARQ-ACK codebook and a downlink signal is determined based on a first target Downlink Allocation Index (DAI) of the downlink signal, in a case that the first HARQ-ACK codebook is a type-2 HARQ-ACK codebook. The first target DAI is a DAI of a downlink signal, herein the DAI of the downlink signal is counted from a starting downlink signal immediately subsequent to the first downlink signal in a plurality of downlink signals corresponding to the first HARQ-ACK codebook; or, the first target DAI is obtained by subtracting the DAI of the first downlink signal from a DAI of a downlink signal, herein the DAI of the downlink signal is counted from a starting downlink signal in the plurality of downlink signals corresponding to the first HARQ-ACK codebook.

The abovementioned technical solution is exemplified below in combination with specific examples.

Example 1

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission the first PUCCH.

Optionally, a starting location of the time domain resource for the first downlink signal is before that of the time domain resource for the third downlink signal.

3. The terminal device receives a second downlink signal. The HARQ-ACK information corresponding to the second downlink signal is transmitted through a second PUCCH.

The time domain resource for the second downlink signal is after the time domain resource for the third downlink signal, and the time domain resource for the second PUCCH and the time domain resource for the first uplink transmission channel do not overlap.

The second PUCCH and the first PUCCH have the same priority in the same time unit (for example, slot, sub-slot). Therefore, the second PUCCH and the first PUCCH correspond to the same HARQ-ACK codebook.

4. The terminal device transmits the first HARQ-ACK codebook through the second PUCCH. The first HARQ-ACK codebook includes the HARQ-ACK information corresponding to the second downlink signal, and does not include the HARQ-ACK information or occupation information corresponding to the first downlink signal.

Further, the first HARQ-ACK codebook does not include the HARQ-ACK information or occupation information corresponding to all downlink signals before the first downlink signal and belonging to a same HARQ-ACK codebook.

That is to say, the first HARQ-ACK codebook merely includes the HARQ-ACK information corresponding to the downlink signal after the downlink signal corresponding to the canceled PUCCH (that is, the first PUCCH).

1) If the first HARQ-ACK codebook is a type-1 HARQ-ACK codebook, correspondences between various bits in the first HARQ-ACK codebook and the downlink signals are determined according to semi-static configuration information (the semi-static configuration is used for determining a feedback timing set, a PDSCH time domain resource indication set, and etc.), but only the HARQ-ACK information corresponding to the downlink signal after the downlink signal corresponding to the canceled PUCCH (that is, the first PUCCH) is valid.

2) If the first HARQ-ACK codebook is a type-2 HARQ-ACK codebook, the correspondences between various bits in the first HARQ-ACK codebook and the downlink signals are determined according to the DAI. Specifically, Method 1: the DAI of the downlink signal (such as the second downlink signal) after the downlink signal corresponding to the canceled PUCCH (that is, the first PUCCH) is counted from the beginning (for example, from 0). The correspondence between a bit in the first HARQ-ACK codebook and a downlink signal is directly determined according to the DAI of the downlink signal.

Method 2: regardless of the downlink signal before or after the downlink signal corresponding to the canceled PUCCH (that is, the first PUCCH), the DAIS of the downlink signals corresponding to the same HARQ-ACK codebook (that is, the first HARQ-ACK codebook) are arranged in sequence. The correspondence between a bit in the first HARQ-ACK codebook and a downlink signal is determined according to a DAI of the downlink signal and a DAI of a downlink signal corresponding to the canceled PUCCH. For example, a DAI of a downlink signal corresponding to the canceled PUCCH is subtracted from a DAI of the downlink signal.

Taking the construction of the type-2 HARQ-ACK codebook as an example, as shown in FIG. 4, the first HARQ-ACK codebook corresponds to three downlink signals, that is, three PDSCHs, are respectively PDSCH0, PDSCH 1, and PDSCH 2. A time domain resource for a PUCCH corresponding to the PDSCH 1 and a time domain resource for a PUCCH corresponding to the PDSCH 3 overlap, and the priority of the PUCCH corresponding to the PDSCH 1 is lower than the priority of the PUCCH corresponding to the PDSCH3, then the PUCCH corresponding to the PDSCH 1 is cancelled. The PUCCH corresponding to the PDSCH 2 is transmitted. The first HARQ-ACK codebook carried in the PUCCH includes the HARQ-ACK information corresponding to the PDSCH 2. The PDSCH 2 corresponds to DAI=2.

Through the abovementioned technical solution, additional transmission of the HARQ-ACK information of the downlink signal corresponding to the first PUCCH (that is, the PUCCH with a time domain resource conflict) is avoided, and the complexity of implementation of a terminal device is reduced.

Mode 2

The first HARQ-ACK codebook includes HARQ-ACK information corresponding to the second downlink signal. The first HARQ-ACK codebook further includes HARQ-ACK information corresponding to the first downlink signal. Further, optionally, the first HARQ-ACK codebook further includes HARQ-ACK information corresponding to at least one downlink signal before the first downlink signal. The at least one downlink signal corresponds to the same HARQ-ACK codebook.

It is to be noted that the first HARQ-ACK codebook includes N bits. N is a positive integer. Each of the N bits corresponds to one downlink signal (that is, one PDSCH). The value of the bit is used for indicating the HARQ-ACK information of the downlink signal corresponding to the bit. For example, the value of the bit is 1, which indicates that the HARQ-ACK information of the downlink signal corresponding to the bit is ACK. The value of the bit is 0, which indicates that the HARQ-ACK information of the downlink signal corresponding to the bit is NACK.

I) In an optional mode, in a case that the first HARQ-ACK codebook is a type-1 HARQ-ACK codebook, the correspondence between a bit in the first HARQ-ACK codebook and a downlink signal is determined based on semi-static configuration information. Here, the semi-static configuration information is used for determining a feedback timing set and a PDSCH time domain resource indication set, etc.

It is to be noted that the bits included in the first HARQ-ACK codebook correspond to various physical resources for the PDSCH that can be transmitted in a feedback window configured by the semi-static configuration information. The number of the actually scheduled PDSCHs is less than or equal to that of the PDSCHs that can be transmitted in the feedback window.

II) In an optional mode, in a case that the first HARQ-ACK codebook is a type-2 HARQ-ACK codebook, the correspondence between a bit in the first HARQ-ACK codebook and a downlink signal is determined based on a first target DAI of the downlink signal. The first target DAI is the DAI of the downlink signal, herein the DAI of the downlink signal is counted from a starting downlink signal in a plurality of downlink signals corresponding to the first HARQ-ACK codebook.

The abovementioned technical solution is exemplified below in combination with specific examples.

Example 2

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission the first PUCCH.

Optionally, a starting location of the time domain resource for the first downlink signal is before that of the time domain resource for the third downlink signal.

3. The terminal device receives a second downlink signal. The HARQ-ACK information corresponding to the second downlink signal is transmitted through a second PUCCH.

The time domain resource for the second downlink signal is after the time domain resource for the third downlink signal, and the time domain resource for the second PUCCH and the time domain resource for the first uplink transmission channel do not overlap.

The second PUCCH and the first PUCCH are in the same time unit (for example, slot, sub-slot) and have the same priority. Therefore, the second PUCCH and the first PUCCH correspond to the same HARQ-ACK codebook.

4. The terminal device transmits the first HARQ-ACK codebook through the second PUCCH. The first HARQ-ACK codebook includes the HARQ-ACK information corresponding to the second downlink signal and the HARQ-ACK information corresponding to the first downlink signal. Further, the first HARQ-ACK codebook further includes the HARQ-ACK information corresponding to all downlink signals belonging to the same HARQ-ACK codebook (that is, the first HARQ-ACK codebook) before the first downlink signal.

1) If the first HARQ-ACK codebook is a type-1 HARQ-ACK codebook, the correspondences between various bits in the first HARQ-ACK codebook and the downlink signals are determined according to semi-static configuration information (the semi-static configuration information is used for determining a feedback timing set, a PDSCH time domain resource indication set, etc.).

2) If the first HARQ-ACK codebook belongs to a type-2 HARQ-ACK codebook, the correspondences between various bits in the first HARQ-ACK codebook and the downlink signals are determined according to the DAIs.

Taking the construction of the type-2 HARQ-ACK codebook as an example, as shown in FIG. 5, the first HARQ-ACK codebook corresponds to three downlink signals, that is, three PDSCHs, are respectively PDSCH 0, PDSCH 1, and PDSCH 2. A time domain resources for a PUCCH corresponding to the PDSCH 1 and a time domain resources for a PUCCH corresponding to the PDSCH 3 overlap, and the priority of the PUCCH corresponding to the PDSCH 1 is lower than the priority of the PUCCH corresponding to the PDSCH3, then the PUCCH corresponding to the PDSCH 1 is cancelled. The PUCCH corresponding to the PDSCH 2 is transmitted. The first HARQ-ACK codebook carried in the PUCCH includes HARQ-ACK information corresponding to the PDSCH 0, HARQ-ACK information corresponding to the PDSCH 1, and HARQ-ACK information corresponding to the PDSCH 2. PDSCH 0 corresponds to DAI=0, PDSCH 1 corresponds to DAI=1, and PDSCH 2 corresponds to DAI=2.

Through the abovementioned technical solution, all HARQ-ACK information needs to be transmitted, which avoids redundant downlink retransmission, and improves the efficiency of the system.

Mode 3

The first HARQ-ACK codebook includes HARQ-ACK information corresponding to the second downlink signal. The first HARQ-ACK codebook further includes occupation information corresponding to the first downlink signal. Further, the first HARQ-ACK codebook further includes occupation information corresponding to at least one downlink signal before the first downlink signal. The at least one downlink signal corresponds to the same HARQ-ACK codebook.

It is to be noted that the first HARQ-ACK codebook includes N bits. N is a positive integer. Each of the N bits corresponds to one downlink signal (that is, one PDSCH). The value of the bit is used for indicating HARQ-ACK information of the downlink signal corresponding to the bit. For example, when the value of the bit is 1, it indicates that the HARQ-ACK information of the downlink signal corresponding to the bit is ACK. When the value of the bit is 0, it indicates that the HARQ-ACK information of the downlink signal corresponding to the bit is NACK.

I) In an optional mode, the correspondence between a bit in the first HARQ-ACK codebook and a downlink signal is determined based on semi-static configuration information in a case that the first HARQ-ACK codebook is a type-1 HARQ-ACK codebook. Here, the semi-static configuration information is used for determining a feedback timing set, a PDSCH time domain resource indication set, etc.

It is to be noted that the bits included in the first HARQ-ACK codebook corresponds to various physical resources for the PDSCHs that can be transmitted in a feedback window configured by the semi-static configuration information. The number of the actually scheduled PDSCHs is less than or equal to that of the PDSCHs that can be transmitted in the feedback window.

II) In an optional mode, in a case that the first HARQ-ACK codebook is a type-2 HARQ-ACK codebook, the correspondence between a bit in the first HARQ-ACK codebook and a downlink signal is determined based on a first target DAI of the downlink signal. The first target DAI is the DAI of the downlink signal, herein the DAI of the downlink signal is counted from a starting downlink signal in a plurality of downlink signals corresponding to the first HARQ-ACK codebook.

The abovementioned technical solution is exemplified below in combination with specific examples.

Example 3

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission the first PUCCH.

Optionally, a starting location of the time domain resource for the first downlink signal is before that of the time domain resource for the third downlink signal.

3. The terminal device receives a second downlink signal. The HARQ-ACK information corresponding to the second downlink signal is transmitted through a second PUCCH.

The time domain resource for the second downlink signal is after the time domain resource for the third downlink signal, and the time domain resource for the second PUCCH and the time domain resource for the first uplink transmission channel do not overlap.

The second PUCCH and the first PUCCH are in the same time unit (for example, slot, sub-slot) and have the same priority. Therefore, the second PUCCH and the first PUCCH correspond to the same HARQ-ACK codebook.

4. The terminal device transmits the first HARQ-ACK codebook through the second PUCCH. The first HARQ-ACK codebook includes the HARQ-ACK information corresponding to the second downlink signal and the occupation information corresponding to the first downlink signal. Further, the first HARQ-ACK codebook further includes the occupation information corresponding to all downlink signals belonging to the same HARQ-ACK codebook (that is, the first HARQ-ACK codebook) before the first downlink signal.

1) If the first HARQ-ACK codebook is a type-1 HARQ-ACK codebook, the correspondences between various bits in the first HARQ-ACK codebook and the downlink signals are determined according to semi-static configuration information (the semi-static configuration information is used for determining a feedback timing set, a PDSCH time domain resource indication set, etc.)

2) If the first HARQ-ACK codebook is a type-2 HARQ-ACK codebook, the correspondences between various bits in the first HARQ-ACK codebook and the downlink signals are determined according to the DAIs.

Figures 6, 7, 8, 9:
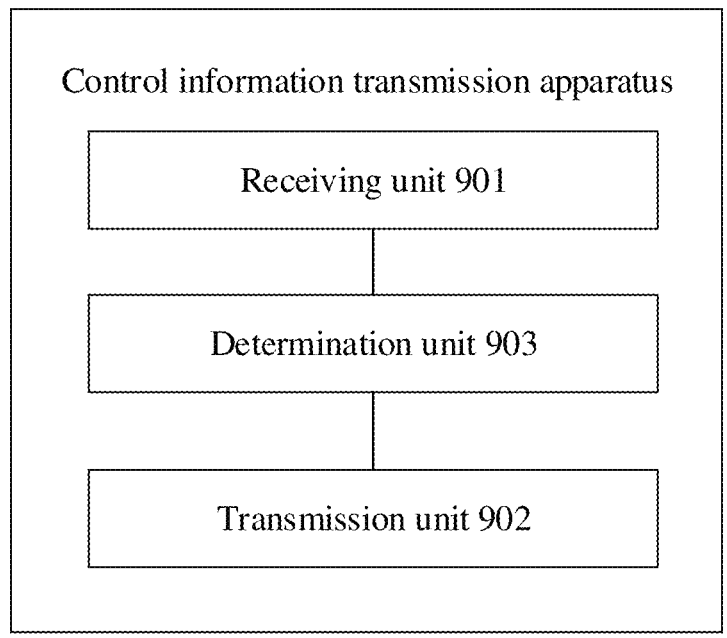
FIG. 6 illustrates a schematic diagram of a first HARQ-ACK codebook of Example 3 according to an embodiment of the present disclosure.
FIG. 7 illustrates a schematic diagram of a first HARQ-ACK codebook of Example 4 according to an embodiment of the present disclosure.
FIG. 8 illustrates a schematic diagram of a first HARQ-ACK codebook of Example 5 according to an embodiment of the present disclosure.
FIG. 9 illustrates a schematic diagram 1 of a structural composition of an apparatus for transmitting control information according to an embodiment of the present disclosure.

Taking the construction of the type-2 HARQ-ACK codebook as an example, as shown in FIG. 6, three downlink signals corresponding to the first HARQ-ACK codebook, that is, corresponding to three PDSCHs, are respectively PDSCH0, PDSCH 1, and PDSCH 2. The time domain resource for the PUCCH corresponding to the PDSCH 1 and the time domain resource for the PUCCH corresponding to the PDSCH 3 overlap, and the priority of the PUCCH corresponding to the PDSCH 1 is lower than the priority of the PUCCH corresponding to the PDSCH3, then the PUCCH corresponding to the PDSCH 1 is cancelled. The PUCCH corresponding to the PDSCH 2 is transmitted. The first HARQ-ACK codebook carried in the PUCCH includes the occupation information corresponding to the PDSCH 0, the occupation information corresponding to the PDSCH 1, and the HARQ-ACK information corresponding to the PDSCH 2. The PDSCH 0 corresponds to DAI=0, PDSCH 1 corresponds to DAI=1, and PDSCH 2 corresponds to DAI=2.

Through the abovementioned technical solution, when the transmission of the first PUCCH is canceled, the HARQ-ACK information in the first PUCCH is also emptied, so as to avoid additional transmission of the HARQ-ACK information of the downlink signal corresponding to the first PUCCH (that is, the PUCCH with a time domain resource conflict), and reduce the implementation complexity of a terminal device.

Mode 4

The first HARQ-ACK codebook includes the HARQ-ACK information corresponding to the second downlink signal. The first HARQ-ACK codebook further includes occupation information corresponding to the first downlink signal. Further, the first HARQ-ACK codebook further includes the HARQ-ACK information corresponding to at least one downlink signal before the first downlink signal. The at least one downlink signal corresponds to the same HARQ-ACK codebook.

It is to be noted that the first HARQ-ACK codebook includes N bits. N is a positive integer. Each of the N bits corresponds to one downlink signal (that is, one PDSCH). The value of the bit is used for indicating the HARQ-ACK information of the downlink signal corresponding to the bit. For example, when the value of the bit is 1, it indicates that the HARQ-ACK information of the downlink signal corresponding to the bit is ACK. When the value of the bit is 0, it indicates that the HARQ-ACK information of the downlink signal corresponding to the bit is NACK.

I) In an optional mode, in a case that the first HARQ-ACK codebook is a type-1 HARQ-ACK codebook, the correspondence between a bit in the first HARQ-ACK codebook and a downlink signal is determined based on semi-static configuration information. Here, the semi-static configuration information is used for determining a feedback timing set, a PDSCH time domain resource indication set, and etc.

It is to be noted that the bit included in the first HARQ-ACK codebook corresponds to various physical resources of the PDSCH that can be transmitted in a feedback window configured by the semi-static configuration information. The number of the actually scheduled PDSCHs is less than or equal to that of the PDSCHs that can be transmitted in the feedback window.

II) In an optional mode, in a case that the first HARQ-ACK codebook is a type-2 HARQ-ACK codebook, the correspondence between a bit in the first HARQ-ACK codebook and a downlink signal is determined based on a first target DAI of the downlink signal. The first target DAI is the DAI of the downlink signal, herein the DAI of the downlink signal is counted from the starting downlink signal in a plurality of downlink signals corresponding to the first HARQ-ACK codebook.

The abovementioned technical solution is exemplified below in combination with specific examples.

Example 4

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission the first PUCCH.

Optionally, a starting location of the time domain resource for the first downlink signal is before that of the time domain resource for the third downlink signal.

3. The terminal device receives a second downlink signal. The HARQ-ACK information corresponding to the second downlink signal is transmitted through a second PUCCH.

The time domain resource for the second downlink signal is after the time domain resource for the third downlink signal, and the time domain resource for the second PUCCH and the time domain resource for the first uplink transmission channel do not overlap.

The second PUCCH and the first PUCCH are in the same time unit (for example, slot, sub-slot) and have the same priority. Therefore, the second PUCCH and the first PUCCH correspond to the same HARQ-ACK codebook.

4. The terminal device transmits the first HARQ-ACK codebook through the second PUCCH. The first HARQ-ACK codebook includes the HARQ-ACK information corresponding to the second downlink signal and the occupation information corresponding to the first downlink signal. Further, the first HARQ-ACK codebook further includes the occupation information corresponding to all downlink signals belonging to the same HARQ-ACK codebook (that is, the first HARQ-ACK codebook) before the first downlink signal.

1) If the first HARQ-ACK codebook is a type-1 HARQ-ACK codebook, the correspondences between various bits in the first HARQ-ACK codebook and the downlink signals are determined according to semi-static configuration information (the semi-static configuration information is used for determining a feedback timing set, a PDSCH time domain resource indication set, etc.).

2) If the first HARQ-ACK codebook belongs to a type-2 HARQ-ACK codebook, the correspondences between various bits in the first HARQ-ACK codebook and the downlink signals are determined according to the DAIs.

Taking the construction of the type-2 HARQ-ACK codebook as an example, as shown in FIG. 7, three downlink signals corresponding to the first HARQ-ACK codebook, that is, corresponding to three PDSCHs, are respectively PDSCH 0, PDSCH 1, and PDSCH 2. The time domain resource for the PUCCH corresponding to the PDSCH 1 and the time domain resource for the PUCCH corresponding to the PDSCH 3 overlap, and the priority of the PUCCH corresponding to the PDSCH 1 is lower than the priority of the PUCCH corresponding to the PDSCH 3, then the PUCCH corresponding to the PDSCH 1 is canceled. The PUCCH corresponding to the PDSCH 2 is transmitted. The first HARQ-ACK codebook carried in the PUCCH includes the HARQ-ACK information corresponding to the PDSCH 0, the occupation information corresponding to the PDSCH 1, and the HARQ-ACK information corresponding to the PDSCH 2. The PDSCH 0 corresponds to DAI=0, PDSCH 1 corresponds to DAI=1, and PDSCH 2 corresponds to DAI=2.

Through the abovementioned technical solution, additional transmission of the HARQ-ACK information of the downlink signal corresponding to the first PUCCH (that is, the PUCCH with a time domain resource conflict) is avoided, and the implementation complexity of a terminal device is reduced.

Mode 5

The first HARQ-ACK codebook includes the HARQ-ACK information corresponding to the second downlink signal. 1) The first HARQ-ACK codebook further includes the HARQ-ACK information corresponding to at least one downlink signal before the first downlink signal. The at least one downlink signal corresponds to the same HARQ-ACK codebook. Or, 2) the first HARQ-ACK codebook further includes the occupation information corresponding to at least one downlink signal before the first downlink signal. The at least one downlink signal corresponds to the same HARQ-ACK codebook.

In the embodiment of the present disclosure, the first HARQ-ACK codebook does not include the HARQ-ACK information or occupation information corresponding to the first downlink signal. The first HARQ-ACK codebook includes the HARQ-ACK information or occupation information corresponding to at least one downlink signal before the first downlink signal.

It is to be noted that the first HARQ-ACK codebook includes N bits. N is a positive integer. Each of the N bits corresponds to one downlink signal (that is, one PDSCH). The value of the bit is used for indicating the HARQ-ACK information of the downlink signal corresponding to the bit. For example, when the value of the bit is 1, it indicates that the HARQ-ACK information of the downlink signal corresponding to the bit is ACK. When the value of the bit is 0, it indicates that the HARQ-ACK information of the downlink signal corresponding to the bit is NACK.

I) In an optional mode, in a case that the first HARQ-ACK codebook is a type-1 HARQ-ACK codebook, the correspondences between bits in the first HARQ-ACK codebook and the downlink signals are determined based on semi-static configuration information. Here, the semi-static configuration information is used for determining a feedback timing set, a PDSCH time domain resource indication set, and etc.

It is to be noted that the bits included in the first HARQ-ACK codebook corresponds to various physical resources of the PDSCH that can be transmitted in a feedback window configured by the semi-static configuration information. The number of the actually scheduled PDSCHs is less than or equal to that of the PDSCHs that can be transmitted in the feedback window.

It is to be noted that in the first HARQ-ACK codebook, only the HARQ-ACK information corresponding to downlink signals other than the downlink signal corresponding to the canceled PUCCH (that is, the first PUCCH) is valid.

II) In an optional mode, in a case that the first HARQ-ACK codebook is a type-2 HARQ-ACK codebook, the correspondence between a bit in the first HARQ-ACK codebook and a downlink signal is determined based on a second target DAI of the downlink signal. The second target DAI is the DAI of the downlink signal, herein the DAI of the downlink signal is counted from a starting downlink signal in a plurality of downlink signals corresponding to the first HARQ-ACK codebook and does not include the first downlink signal; or, the second target DAI is obtained by subtracting the number of first PUCCHs, of which transmission is canceled, before the downlink signal from the DAI of the downlink signal; or, the DAI of the downlink signal is counted from the starting downlink signal in the plurality of downlink signals corresponding to the first HARQ-ACK codebook.

The abovementioned technical solution is exemplified below in combination with specific examples.

Example 5

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission the first PUCCH.

Optionally, a starting location of the time domain resource for the first downlink signal is before that of the time domain resource for the third downlink signal.

3. The terminal device receives a second downlink signal. The HARQ-ACK information corresponding to the second downlink signal is transmitted through a second PUCCH.

The time domain resource for the second downlink signal is after the time domain resource for the third downlink signal, and the time domain resource for the second PUCCH and the time domain resource for the first uplink transmission channel do not overlap.

The second PUCCH and the first PUCCH are in the same time unit (for example, slot, sub-slot) and have the same priority. Therefore, the second PUCCH and the first PUCCH correspond to the same HARQ-ACK codebook.

4. The terminal device transmits the first HARQ-ACK codebook through the second PUCCH. The first HARQ-ACK codebook includes the HARQ-ACK information corresponding to the second downlink signal. Further, the first HARQ-ACK codebook further includes the occupation information or HARQ-ACK information corresponding to all downlink signals belonging to the same HARQ-ACK codebook (that is, the first HARQ-ACK codebook) before the first downlink signal.

The first HARQ-ACK codebook only includes the HARQ-ACK information or occupation information corresponding to other downlink signals than the downlink signal corresponding to the canceled PUCCH (that is, the first PUCCH).

1) If the first HARQ-ACK codebook belongs to a type-1 HARQ-ACK codebook, the correspondences between various bits in the first HARQ-ACK codebook and the downlink signals are determined according to semi-static configuration information (the semi-static configuration information is used for determining a feedback timing set, a PDSCH time domain resource indication set, etc.).

In the first HARQ-ACK codebook, only the HARQ-ACK information or occupation information corresponding to other downlink signals than the downlink signal corresponding to the canceled PUCCH (that is, the first PUCCH) is valid.

2) If the first HARQ-ACK codebook belongs to a type-2 HARQ-ACK codebook, the correspondences between various bits in the first HARQ-ACK codebook and the downlink signals are determined according to the DAI. Specifically, Method 1: the DAIS of other downlink signals (such as the second downlink signal) than the downlink signal corresponding to the canceled PUCCH (that is, the first PUCCH) are arranged in sequence. The correspondences between various bits in the first HARQ-ACK codebook and the downlink signals are directly determined according to the DAIS of the downlink signals.

Method 2: regardless of either the downlink signal before or after the downlink signal corresponding to the canceled PUCCH (that is, the first PUCCH), the DAIS of the downlink signals corresponding to the same HARQ-ACK codebook (that is, the first HARQ-ACK codebook) are arranged in sequence. The correspondence between a bit in the first HARQ-ACK codebook and a downlink signal is determined according to the DAI of the downlink signal and the number M of canceled PUCCHs before the downlink signal, for example, subtracting the number M of canceled PUCCHs before the downlink signal from the DAI of the downlink signal.

Taking the construction of the type-2 HARQ-ACK codebook as an example, as shown in FIG. 8, three downlink signals corresponding to the first HARQ-ACK codebook, that is, corresponding to three PDSCHs, are respectively PDSCH 0, PDSCH 1, and PDSCH 2. The time domain resource for the PUCCH corresponding to the PDSCH 1 and the time domain resource for the PUCCH corresponding to the PDSCH 3 overlap, and the priority of the PUCCH corresponding to the PDSCH 1 is lower than the priority of the PUCCH corresponding to the PDSCH3, then the PUCCH corresponding to the PDSCH 1 is cancelled. The PUCCH corresponding to the PDSCH 2 is transmitted. The first HARQ-ACK codebook carried in the PUCCH includes the HARQ-ACK information or occupation information corresponding to the PDSCH 0, and the HARQ-ACK information corresponding to the PDSCH 2. The PDSCH 0 corresponds to DAI=0, and PDSCH 2 corresponds to DAI=2.

Through the abovementioned technical solution, additional transmission of the HARQ-ACK information of the downlink signal corresponding to the first PUCCH (that is, the PUCCH with a time domain resource conflict) is avoided, and the implementation complexity of a terminal device is reduced.

In the embodiment of the present disclosure, the following technical solution is further provided: a terminal device receives a first downlink signal, the HARQ-ACK information corresponding to the first downlink signal is transmitted through a first PUCCH; and the terminal device cancels the transmission of the first PUCCH and does not expect to receive a second downlink signal, the HARQ-ACK information corresponding to the second downlink signal is transmitted through a second PUCCH. The second PUCCH and the first PUCCH correspond to the same HARQ-ACK codebook.

The abovementioned technical solution is exemplified below in combination with specific examples.

Example 6

1. The terminal device receives a first downlink signal. HARQ-ACK information corresponding to the first downlink signal is transmitted through a first PUCCH.

2. The terminal device receives a third downlink signal. A time domain resource for a first uplink transmission channel corresponding to the third downlink signal overlaps with a time domain resource for the first PUCCH, and the terminal device cancels the transmission of the first PUCCH.

Optionally, a starting location of the time domain resource for the first downlink signal is before that of the time domain resource for the third downlink signal.

3. The terminal device does not expect to receive a second downlink signal. The HARQ-ACK information corresponding to the second downlink signal is transmitted through a second PUCCH. A time domain location of the second downlink signal is after the time domain location of the third downlink signal, and the time domain resource for the second PUCCH and the time domain resource for the first uplink transmission channel do not overlap. The second PUCCH and the first PUCCH correspond to the same HARQ-ACK codebook in the same slot or sub-slot.

Through the abovementioned technical solution, redundant downlink retransmission can be avoided, and the implementation complexity of the terminal device can also be reduced.

FIG. 9 illustrates a schematic diagram 1 of a structural composition of an apparatus for transmitting control information according to an embodiment of the present disclosure, which is applied to the terminal device. As shown in FIG. 9, the apparatus for transmitting control information includes a receiving unit 901 and a transmission unit 902.

The receiving unit 901 is configured to receive a first downlink signal, the HARQ-ACK information corresponding to the first downlink signal being transmitted through a first PUCCH; and receive a second downlink signal, the HARQ-ACK information corresponding to the second downlink signal being transmitted through a second PUCCH. The second PUCCH and the first PUCCH correspond to the same HARQ-ACK codebook.

The transmission unit 902 is configured to cancel transmission of the first PUCCH and transmit the second PUCCH. The second PUCCH carries a first HARQ-ACK codebook, and the first HARQ-ACK codebook at least includes the HARQ-ACK information corresponding to the second downlink signal.

In an optional mode, the receiving unit 901 is further configured to receive a third downlink signal. A time domain resource for the third downlink signal is located before a time domain resource for the second downlink signal.

The apparatus further includes: a determination unit 903, configured to: determine to cancel the transmission of the first PUCCH in a case that the first uplink transmission channel corresponding to the third downlink signal overlaps with the time domain resource for the first PUCCH; and determine to transmit the second PUCCH in a case that the time domain resource for the first uplink transmission channel corresponding to the third downlink signal does not overlap with the time domain resource for the second PUCCH.

In an optional mode, the first HARQ-ACK codebook further includes the HARQ-ACK information corresponding to the first downlink signal.

In an optional mode, the first HARQ-ACK codebook further includes the HARQ-ACK information corresponding to at least one downlink signal before the first downlink signal. The at least one downlink signal corresponds to the same HARQ-ACK codebook.

In an optional mode, the first HARQ-ACK codebook further includes occupation information corresponding to the first downlink signal.

In an optional mode, the first HARQ-ACK codebook further includes the occupation information corresponding to at least one downlink signal before the first downlink signal. The at least one downlink signal corresponds to the same HARQ-ACK codebook.

In an optional mode, the first HARQ-ACK codebook further includes the HARQ-ACK information corresponding to at least one downlink signal before the first downlink signal. The at least one downlink signal corresponds to the same HARQ-ACK codebook.

In an optional mode, the correspondence between a bit in the first HARQ-ACK codebook and a downlink signal is determined based on a first target DAI of the downlink signal in a case that the first HARQ-ACK codebook is a type-2 HARQ-ACK codebook.

The first target DAI is a DAI of the downlink signal, wherein the DAI of the downlink signal is counted from a starting downlink signal after the first downlink signal in a plurality of downlink signals corresponding to the first HARQ-ACK codebook.

Or, the first target DAI is obtained by subtracting the DAI of the first downlink signal from the DAI of the downlink signal, wherein the DAI of the downlink signal is counted from the starting downlink signal in the plurality of downlink signals corresponding to the first HARQ-ACK codebook.

Or, the first target DAI is the DAI of the downlink signal, wherein the DAI of the downlink signal is counted from the starting downlink signal in the plurality of downlink signals corresponding to the first HARQ-ACK codebook.

In an optional mode, the first HARQ-ACK codebook further includes the HARQ-ACK information corresponding to at least one downlink signal before the first downlink signal. The at least one downlink signal corresponds to the same HARQ-ACK codebook.

In an optional mode, the first HARQ-ACK codebook further includes the occupation information corresponding to at least one downlink signal before the first downlink signal. The at least one downlink signal corresponds to the same HARQ-ACK codebook.

In an optional mode, the correspondence between a bit in the first HARQ-ACK codebook and a downlink signal is determined based on a second target DAI of the downlink signal in a case that the first HARQ-ACK codebook is a type-2 HARQ-ACK codebook.

The second target DAI is the DAI of the downlink signal, wherein the DAI of the downlink signal is counted from a starting downlink signal in a plurality of downlink signals corresponding to the first HARQ-ACK codebook and does not comprise the first downlink signal.

Or, the second target DAI is obtained by subtracting the number of first PUCCHs of which transmission is canceled before the downlink signal from the DAI of the downlink signal, wherein the DAI of the downlink signal is counted from the starting downlink signal in the plurality of downlink signals corresponding to the first HARQ-ACK codebook.

In an optional mode, the correspondence between a bit in the first HARQ-ACK codebook and a downlink signal is determined based on semi-static configuration information in a case that the first HARQ-ACK codebook is a type-1 HARQ-ACK codebook.

Those skilled in the art should understand that the relevant description of the abovementioned apparatus for transmitting control information of the embodiments of the present disclosure can be understood with reference to the relevant description of the method for transmitting control information of the embodiments of the present disclosure.

Figure 10:
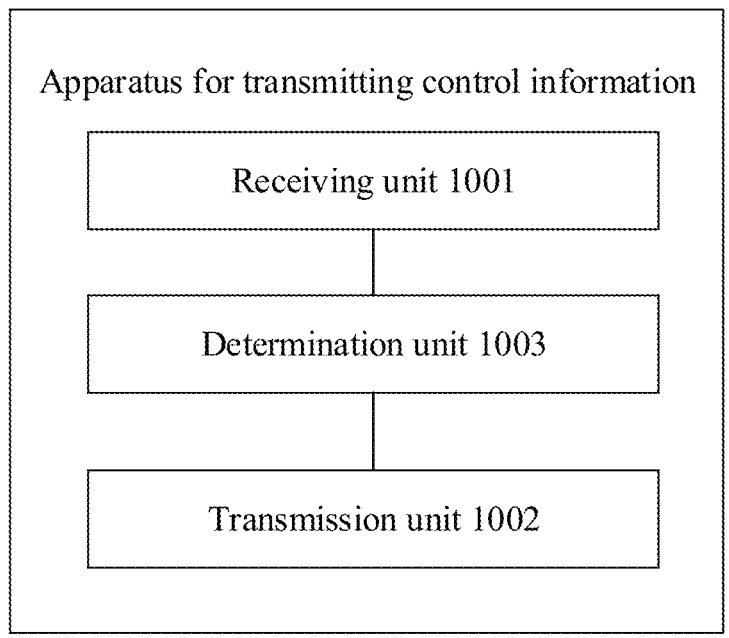
FIG. 10 illustrates a schematic diagram 2 of structural compositions of an apparatus for transmitting control information according to an embodiment of the present disclosure.

FIG. 10 illustrates a schematic diagram 2 of a structural composition of an apparatus for transmitting control information according to an embodiment of the present disclosure, which is applied to the terminal device. As shown in FIG. 10, the apparatus for transmitting control information includes a receiving unit 1001 and a transmission unit 1002.

The receiving unit 1001 is configured to receive a first downlink signal. The HARQ-ACK information corresponding to the first downlink signal is transmitted through a first PUCCH.

The transmission unit 1002 is configured to cancel transmission of the first PUCCH and not to expect to receive a second downlink signal. The HARQ-ACK information corresponding to the second downlink signal is transmitted through a second PUCCH. The second PUCCH and the first PUCCH correspond to the same HARQ-ACK codebook.

In an optional mode, the receiving unit 1001 is further configured to receive a third downlink signal. A time domain resource for the third downlink signal is located before a time domain resource for the second downlink signal.

The time domain resource for the first uplink transmission channel corresponding to the third downlink signal does not overlap with the time domain resource for the second PUCCH.

In an optional mode, the apparatus further includes a determination unit 1003.

The determination unit 1003 is configured to determine to cancel transmission of the first PUCCH in a case that the time domain resource for the first uplink transmission channel corresponding to the third downlink signal overlaps with the time domain resource for the first PUCCH.

Those skilled in the art should understand that the relevant description of the abovementioned apparatus for transmitting control information of the embodiments of the present disclosure can be understood with reference to the relevant description of the method for transmitting control information of the embodiments of the present disclosure.

Figure 11:
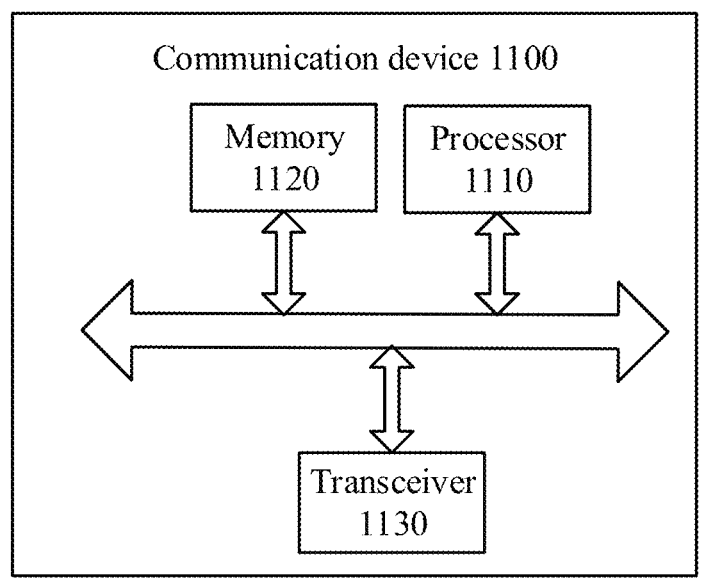
FIG. 11 illustrates a schematic structural diagram of a terminal device according to an embodiment of the present disclosure.

FIG. 11 illustrates a schematic structural diagram of a terminal device 1100 according to an embodiment of the present disclosure. The terminal device 1100 as shown in FIG. 11 includes a processor 1110. The processor 1110 may call and run a computer program from a memory to implement the method in the embodiment of the present disclosure.

Optionally, as shown in FIG. 11, the terminal device 1100 may further include a memory 1120. The processor 1110 may call and run the computer program from the memory 1120 to implement the method in the embodiments of the present disclosure.

The memory 1120 may be independent of the processor 1110, or may be integrated into the processor 1110.

Optionally, as shown in FIG. 11, the terminal device 1100 may also include a transceiver 1130. The processor 1110 may control the transceiver 1130 to be in communication with other devices, specifically, to send information or data to other devices, or receive the information or data sent by other devices.

The transceiver 1130 may include a transmitter and a receiver. The transceiver 1130 may further include an antenna. There may be one or more antennae.

In specific implementation, the receiving unit and the transmission unit in the control information apparatus in the abovementioned solutions of the present disclosure may be implemented by the transceiver 1130 in the terminal device. The determination unit in the control information apparatus may be implemented by a processor 1110 in the terminal device.

Optionally, the terminal device 1100 may specifically be a network device of the embodiment of the present disclosure, and the terminal device 1100 may implement corresponding flows implemented by the network device in various methods of the embodiments of the present disclosure, which will not be elaborated here for simplicity.

Optionally, the terminal device 1100 may specifically be a mobile terminal/a terminal device of the embodiment of the present disclosure, and the terminal device 1100 may implement corresponding flows implemented by the mobile terminal/the terminal device in various methods of the embodiments of the present disclosure, which will not be elaborated here for simplicity.

Figure 12:
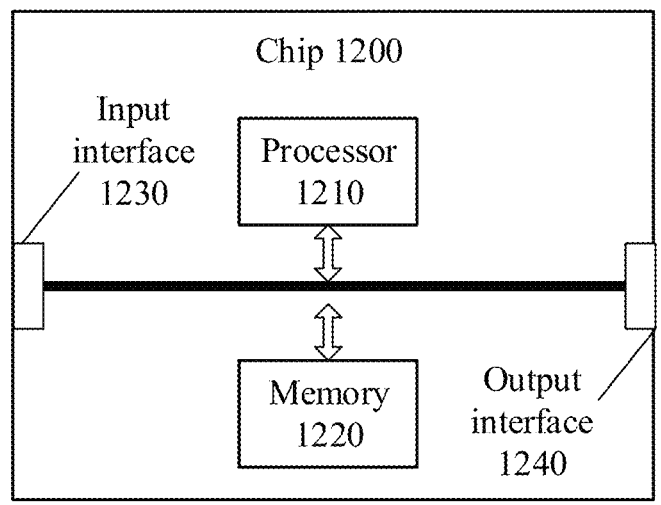
FIG. 12 illustrates a schematic structural diagram of a chip according to an embodiment of the present disclosure.

FIG. 12 illustrates a schematic structural diagram of a chip according to an embodiment of the present disclosure. The chip 1200 as shown in FIG. 12 includes a processor 1210. The processor 1210 may call and run a computer program from a memory to implement the method in the embodiments of the present disclosure.

Optionally, as shown in FIG. 12, the chip 1200 may further include a memory 1220. The processor 1210 may call and run the computer program from the memory 1220 to implement the method in the embodiments of the present disclosure.

The memory 1220 may be independent of the processor 1210, or may be integrated into the processor 1210.

Optionally, the chip 1200 may further include an input interface 1230. The processor 1210 may control the input interface 1230 to be in communication with other devices or chips, specifically, to acquire the information or data sent by other devices or chips.

Optionally, the chip 1200 may further include an output interface 1240. The processor 1210 may control the output interface 1240 to be in communication with other devices or chips, specifically, to output information or data sent to other devices or chips.

Optionally, the chip may be applied to a network device in the embodiments of the present disclosure, and the chip may implement corresponding flows implemented by the network device in various methods of the embodiments of the present disclosure, which will not be elaborated here for simplicity.

Optionally, the communications device may specifically be a mobile terminal/a terminal device of the embodiment of the present disclosure, and the chip may implement corresponding flows implemented by the mobile terminal/the terminal device in various methods of the embodiments of the present disclosure, which will not be elaborated here for simplicity.

It should be understood that the chip mentioned in the embodiments of the present disclosure may also be called a system-level chip, a system chip, a chip system, or a system on chip, etc.

Figure 13:
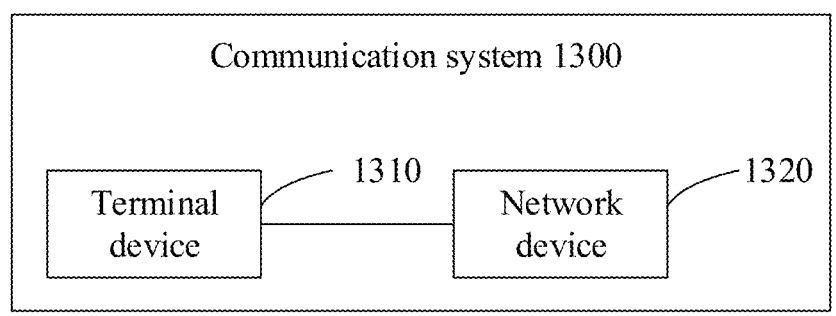
FIG. 13 illustrates a schematic block diagram of a communication system according to an embodiment of the present disclosure.

FIG. 13 is a schematic block diagram of a communication system 1300 according to an embodiment of the present disclosure. As shown in FIG. 13, the communication system 1300 includes a terminal device 1310 and a network device 1320.

The terminal device 1310 may be configured to realize corresponding functions realized by the terminal device in the abovementioned method, and the network device 1320 may be configured to realize corresponding functions realized by the network device in the abovementioned method, which will not be elaborated here for simplicity.

It should be understood that the processor of the embodiments of the present disclosure may be an integrated circuit chip with signal processing capacity. In an implementation process, various steps of the abovementioned method embodiments may be completed by an integrated logic circuit of hardware in the processor or an instruction in the form of software. The abovementioned processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams of the disclosure in the embodiments of this application may be implemented or performed. The general-purpose processor may be a microprocessor, any conventional processor, or the like. Steps of the methods disclosed with reference to the embodiments of the present disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the present disclosure may be a volatile memory or a nonvolatile memory, or may include a volatile memory and a nonvolatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in this specification includes but is not limited to these and any other proper types of memories.

It should be understood that the abovementioned memories are exemplary but not restrictive, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the present disclosure are intended to include, but not limited to, these and any other suitable types of memories.

The embodiments of the present disclosure further provide a computer readable storage medium, which is configured to store a computer program.

Optionally, the computer readable storage medium may be applied to a network device in the embodiments of the present disclosure. The computer program enables a computer to execute corresponding flows implemented by the network device in each method of the embodiments of the present disclosure, which will not be elaborated here for simplicity.

Optionally, the computer readable storage medium may be applied to a mobile terminal/a terminal device in the embodiments of the present disclosure. The computer program enables a computer to execute corresponding flows implemented by the mobile terminal/the terminal device in each method of the embodiments of the present disclosure, which will not be elaborated here for simplicity.

The embodiments of the present disclosure further provide a computer program product, which includes a computer program instruction.

Optionally, the computer program product may be applied to a network device in the embodiments of the present disclosure. The computer program instruction enables a computer to execute corresponding flows implemented by the network device in each method of the embodiments of the present disclosure, which will not be elaborated here for simplicity.

Optionally, the computer program product may be applied to a mobile terminal/a terminal device in the embodiments of the present disclosure. The computer program instruction enables a computer to execute corresponding flows implemented by the mobile terminal/the terminal device in each method of the embodiments of the present disclosure, which will not be elaborated here for simplicity.

The embodiments of the present disclosure further provide a computer program.

Optionally, the computer program may be applied to a network device in the embodiments of the present disclosure. The computer program runs in a computer to enable the computer to execute corresponding flows implemented by the network device in each method of the embodiments of the present disclosure, which will not be elaborated here for simplicity.

Optionally, the computer program may be applied to a mobile terminal/a terminal device in the embodiments of the present disclosure. When running on a computer, the computer program enables a computer to execute corresponding flows implemented by the mobile terminal/the terminal device in each method of the embodiments of the present disclosure, which will not be elaborated here for simplicity.

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Those skilled in the art may implement the described functions in different ways for each specific application, but such implementation should not be considered beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the present disclosure, it should be understood that the disclosed system, apparatus, and method may be implemented in other modes. For example, the described apparatus embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are realized in a form of a software functional unit and sold or used as an independent product, they may be stored in a computer readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The above-mentioned storage medium includes: various media capable of storing program codes such as a U disk, a mobile hard disk, a ROM, a RAM, a magnetic disk, or an optical disk.

The above descriptions are merely specific implementation modes of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A method for transmitting control information, comprising:
    receiving, by a terminal device, a first downlink signal, Hybrid Automatic Repeat Request-Acknowledgement (HARQ-ACK) information corresponding to the first downlink signal being transmitted through a first Physical Uplink Control Channel (PUCCH);
    receiving, by the terminal device, a second downlink signal, HARQ-ACK information corresponding to the second downlink signal being transmitted through a second PUCCH, wherein the second PUCCH and the first PUCCH correspond to a same HARQ-ACK codebook; and
    canceling, by the terminal device, transmission of the first PUCCH, and transmitting the second PUCCH, the second PUCCH carrying a first HARQ-ACK codebook, and the first HARQ-ACK codebook at least comprising the HARQ-ACK information corresponding to the second downlink signal;
    wherein in a case that the first HARQ-ACK codebook is a type-2 HARQ-ACK codebook, a correspondence between a bit in the first HARQ-ACK codebook and a downlink signal is determined based on a first target Downlink Allocation Index (DAI) of the downlink signal, wherein
    the first target DAI is a DAI of the downlink signal, wherein the DAI of the downlink signal is counted from a starting downlink signal after the first downlink signal in a plurality of downlink signals corresponding to the first HARQ-ACK codebook; or,
    the first target DAI is obtained by subtracting the DAI of the first downlink signal from the DAI of the downlink signal, wherein the DAI of the downlink signal is counted from the starting downlink signal in the plurality of downlink signals corresponding to the first HARQ-ACK codebook.

2. The method of claim 1, further comprising:
receiving, by the terminal device, a third downlink signal, a time domain resource for the third downlink signal being located before a time domain resource for the second downlink signal; and
in a case that a time domain resource for a first uplink transmission channel corresponding to the third downlink signal overlaps with a time domain resource for the first PUCCH, determining, by the terminal device, to cancel the transmission of the first PUCCH;
in a case that the time domain resource for the first uplink transmission channel corresponding to the third downlink signal does not overlap with the time domain resource for the second PUCCH, determining, by the terminal device, to transmit the second PUCCH.

3. The method of claim 1, wherein the first HARQ-ACK codebook further comprises the HARQ-ACK information corresponding to the first downlink signal.

4. The method of claim 3, wherein the first HARQ-ACK codebook further comprises HARQ-ACK information corresponding to at least one downlink signal before the first downlink signal; and the at least one downlink signal corresponds to the same HARQ-ACK codebook.

5. The method of claim 1, wherein the first HARQ-ACK codebook further comprises occupation information corresponding to the first downlink signal.

6. The method of claim 5, wherein the first HARQ-ACK codebook further comprises occupation information corresponding to at least one downlink signal before the first downlink signal; and the at least one downlink signal corresponds to the same HARQ-ACK codebook.

7. The method of claim 5, wherein the first HARQ-ACK codebook further comprises HARQ-ACK information corresponding to at least one downlink signal before the first downlink signal; and the at least one downlink signal corresponds to the same HARQ-ACK codebook.

8. The method of claim 1, wherein in a case that the first HARQ-ACK codebook is a type-1 HARQ-ACK codebook, a correspondence between a bit in the first HARQ-ACK codebook and a downlink signal is determined based on semi-static configuration information.

9. The method of claim 1, wherein the first HARQ-ACK codebook does not comprise the HARQ-ACK information or occupation information corresponding to the first downlink signal.

10. A terminal device, comprising:
an input interface, configured to: receive a first downlink signal, Hybrid Automatic Repeat Request-Acknowledgement (HARQ-ACK) information corresponding to the first downlink signal being transmitted through a first Physical Uplink Control Channel (PUCCH); and
receive a second downlink signal, HARQ-ACK information corresponding to the second downlink signal being transmitted through a second PUCCH, wherein the second PUCCH and the first PUCCH correspond to a same HARQ-ACK codebook; and
an output interface, configured to cancel transmission of the first PUCCH and transmit the second PUCCH, the second PUCCH carrying a first HARQ-ACK codebook, and the first HARQ-ACK codebook at least comprising the HARQ-ACK information corresponding to the second downlink signal;
wherein in a case that the first HARQ-ACK codebook is a type-2 HARQ-ACK codebook, a correspondence between a bit in the first HARQ-ACK codebook and a downlink signal is determined based on a first target Downlink Allocation Index (DAI) of the downlink signal, wherein
the first target DAI is a DAI of the downlink signal, wherein the DAI of the downlink signal is counted from a starting downlink signal after the first downlink signal in a plurality of downlink signals corresponding to the first HARQ-ACK codebook; or,
the first target DAI is obtained by subtracting the DAI of the first downlink signal from the DAI of the downlink signal, wherein the DAI of the downlink signal is counted from the starting downlink signal in the plurality of downlink signals corresponding to the first HARQ-ACK codebook.

11. The terminal device of claim 10, wherein the first HARQ-ACK codebook further comprises the HARQ-ACK information corresponding to the first downlink signal.

12. The terminal device of claim 10, wherein the input interface is further configured to receive a third downlink signal, a time domain resource for the third downlink signal being located before a time domain resource for the second downlink signal, wherein
the terminal device further comprises a processor, configured to determine to transmit the second PUCCH in a case that a time domain resource for a first uplink transmission channel corresponding to the third downlink signal does not overlap with the time domain resource for the second PUCCH.

13. The terminal device of claim 12, wherein:
the processor is further configured to determine to cancel the transmission of the first PUCCH in a case that the time domain resource for the first uplink transmission channel corresponding to the third downlink signal overlaps with a time domain resource for the first PUCCH.

14. The terminal device of claim 10, wherein the first HARQ-ACK codebook does not comprise the HARQ-ACK information or occupation information corresponding to the first downlink signal.

* * * * *